(12) United States Patent
Ebersold et al.

(10) Patent No.: US 11,946,915 B2
(45) Date of Patent: Apr. 2, 2024

(54) INTERCHANGEABLE CHROMATOGRAPHY CARTRIDGEADAPTER SYSTEM

(71) Applicant: Supercritical Fluid Technologies, Inc., Newark, DE (US)

(72) Inventors: Curtis Ebersold, Newark, DE (US); Kim Ferrara, Middletown, DE (US)

(73) Assignee: Supercritical Fluid Technologies, Inc., Newark, DE (US)

( * ) Notice: Subject to any disclaimer, the term of this patent is extended or adjusted under 35 U.S.C. 154(b) by 269 days.

(21) Appl. No.: 17/416,964

(22) PCT Filed: Jan. 3, 2020

(86) PCT No.: PCT/US2020/012275
§ 371 (c)(1),
(2) Date: Jun. 21, 2021

(87) PCT Pub. No.: WO2020/142753
PCT Pub. Date: Jul. 9, 2020

(65) Prior Publication Data
US 2022/0082536 A1     Mar. 17, 2022

Related U.S. Application Data (60) Provisional application No. 62/788,724, filed on Jan. 4, 2019.

(51) Int. Cl.
*G01N 30/60* (2006.01)
*B01D 15/20* (2006.01)
*B01D 15/22* (2006.01)

(52) U.S. Cl.
CPC ......... *G01N 30/6091* (2013.01); *B01D 15/20* (2013.01); *B01D 15/22* (2013.01); *B01D 2256/22* (2013.01)

(58) Field of Classification Search
CPC .... B01D 15/20; B01D 15/22; B01D 2256/22; B01D 53/025; G01N 30/6047; G01N 30/6091
(Continued)

(56) References Cited

U.S. PATENT DOCUMENTS 3,322,188 A  5/1967  Ostrander
4,033,140 A  7/1977  Klee et al.
(Continued)

FOREIGN PATENT DOCUMENTS

CA     2917035 A1   1/2015
CN     202802826 U  3/2013
(Continued)

OTHER PUBLICATIONS

Campbell et al., "Supercritical fluid fractionation of petroleum-and-coal-derived mixtures" Analytical Chemistry 58 (11):2247-2251, Sep. 1986.
(Continued)

*Primary Examiner* — Terry K Cecil
(74) *Attorney, Agent, or Firm* — Devlin Law Firm LLC; James M. Lennon (57) ABSTRACT

A chromatography system has a cartridge adapter that is detachably attachable to enable a chromatography cartridge to be quickly interchanged. Chromatography cartridges are configured with threads for coupling to a corresponding interchangeable coupling component having matching threads. The interchangeable coupling component may be secured to the chromatography system by a coupling retainer. A coupling retainer may have a keyway that is configured for quick interchanging of the interchangeable coupling components. The interchangeable coupling component may have a pair of parallel sides that align with a slot of the keyway to secure the interchangeable coupling com-
(Continued)

ponents to the coupling retainer. An inlet nipple of the chromatography cartridge may extend through an opening in the coupling components and couple to an inlet conduit for sample gas. Analyte gas may flow back to the chromatography system for detection and collection.

32 Claims, 9 Drawing Sheets

(58) Field of Classification Search
USPC .................................................. 422/70, 89
See application file for complete search history.

(56) References Cited

U.S. PATENT DOCUMENTS

| | | | |
|---|---|---|---|
| 4,187,177 A | 2/1980 | Stahl | |
| 4,222,414 A | 9/1980 | Achener | |
| 4,604,198 A | 8/1986 | Dailey et al. | |
| 4,737,284 A * | 4/1988 | Hauke | G01N 30/6039 96/104 |
| 4,814,089 A | 3/1989 | Kumar | |
| 4,845,985 A | 4/1989 | Berger | |
| 4,871,453 A | 10/1989 | Kumar | |
| 5,060,481 A | 10/1991 | Bartlett et al. | |
| 5,147,538 A | 9/1992 | Wright et al. | |
| 5,167,930 A | 12/1992 | Fassbender | |
| 5,196,575 A | 3/1993 | Sebastian | |
| 5,250,195 A | 10/1993 | Winter et al. | |
| 5,324,427 A | 6/1994 | Traveset-Masanes et al. | |
| 5,384,051 A | 1/1995 | McGinness | |
| 5,582,723 A | 12/1996 | Boone et al. | |
| 5,601,707 A | 2/1997 | Clay et al. | |
| 5,976,381 A | 11/1999 | Lundell et al. | |
| 6,001,260 A | 12/1999 | Hatch et al. | |
| 6,015,491 A | 1/2000 | Renard et al. | |
| 6,086,767 A | 7/2000 | Walters et al. | |
| 6,413,428 B1 | 7/2002 | Berger et al. | |
| 6,561,767 B2 | 5/2003 | Berger et al. | |
| 6,648,609 B2 | 11/2003 | Berger et al. | |
| 6,936,165 B2 | 8/2005 | Seydoux et al. | |
| 6,982,007 B2 | 1/2006 | Worm et al. | |
| 7,013,660 B2 | 3/2006 | Kim | |
| 7,048,517 B2 | 5/2006 | Berger et al. | |
| 7,083,395 B2 | 8/2006 | Maiefski et al. | |
| 7,125,453 B2 | 10/2006 | D'Evelyn et al. | |
| 7,937,990 B2 | 5/2011 | Nagaoka et al. | |
| 8,173,024 B2 | 5/2012 | Titmas | |
| 8,215,922 B2 | 7/2012 | Berger et al. | |
| 8,246,834 B2 | 8/2012 | Chordia et al. | |
| 8,419,936 B2 | 4/2013 | Berger et al. | |
| 10,610,808 B2 | 4/2020 | James et al. | |
| 10,765,968 B2 | 9/2020 | James et al. | |
| 2002/0139752 A1 | 10/2002 | Berger et al. | |
| 2002/0144949 A1 | 10/2002 | Berger et al. | |
| 2003/0215341 A1 | 11/2003 | Maiefski et al. | |
| 2004/0096986 A1 | 5/2004 | Klein et al. | |
| 2005/0011835 A1* | 1/2005 | Henderson | B01D 15/22 210/656 |
| 2005/0247632 A1 | 11/2005 | Ellis et al. | |
| 2007/0006609 A1 | 1/2007 | Thomas et al. | |
| 2009/0113903 A1 | 5/2009 | Babkin et al. | |
| 2010/0077874 A1 | 4/2010 | Kanomata | |
| 2010/0326133 A1 | 12/2010 | Beeby et al. | |
| 2011/0030186 A1 | 2/2011 | Yamagata et al. | |
| 2011/0146302 A1 | 6/2011 | Newman et al. | |
| 2011/0306146 A1 | 12/2011 | Sidhu et al. | |
| 2011/0315243 A1 | 12/2011 | Hayashi | |
| 2012/0122705 A1 | 5/2012 | Ting et al. | |
| 2013/0015138 A1 | 1/2013 | Schlake et al. | |
| 2013/0180404 A1 | 7/2013 | Fogelman et al. | |
| 2013/0289300 A1 | 10/2013 | Yu et al. | |
| 2014/0190183 A1 | 7/2014 | Berger et al. | |
| 2016/0370036 A1 | 12/2016 | Herzog et al. | |
| 2017/0189831 A1 | 7/2017 | James et al. | |
| 2017/0246558 A1 | 8/2017 | James et al. | |
| 2018/0112896 A1 | 4/2018 | James et al. | |
| 2020/0056815 A1 | 2/2020 | James et al. | |

FOREIGN PATENT DOCUMENTS

| | | | |
|---|---|---|---|
| DE | | 2739860 A1 | 3/1979 |
| WO | WO 2005-149170 A1 | | 6/2005 |
| WO | WO 2015-000708 A1 | | 1/2015 |
| WO | WO 2016-028521 A2 | | 2/2016 |
| WO | WO 2018-071884 A1 | | 4/2018 |

OTHER PUBLICATIONS

Exergy LLC, "Tube-in-tube heat exchangers". Oct. 21, 2014. https://web.archive.org/web/20141021014616/http://www.exergyllc.com/tube-in-tube-heat-exchangers.html (Year: 2014).
Jentoft et al., "Apparatus for Supercritical Fluid Chromatography with Carbon Dioxide as the Mobile Phase" Analytical Chemistry 44(4):681-686, Apr. 1972.
Still et al., "Rapid Chromatographic Technique for Preparative Separations with Moderate Resolution" J Org Chem. 43(14): 2923-2925, 1978.
Suman S et al., "Cryogenic/sub-ambient cooling of electronics: revisited", The Ninth Intersociety Conference on Thermal and Thermomechanical Phenomena in Electronic Systems, 2004, ITHERM '04, IEEE, (Jan. 1, 2004), doi: 10.1109/ITHERM.2004.1319178, ISBN 978-0-7803-8357-9, pp. 224-231.
Widyaparaga A et al., "Study on a wire-type Joule Thomson microcooler with a concentric heat exchanger", Applied Thermal Engineering, Pergamon, Oxford, GB, vol. 30, No. 16, ISSN 1359-4311, (Nov. 1, 2010), pp. 2563-2573, (Jul. 15, 2010).
International Search Report for PCT/US2015/044306, dated Feb. 25, 2016.
International Search Report for PCT/US2017/056696, dated Jan. 30, 2018.
International Search Report for PCT/US2020/012275, dated Mar. 10, 2020.
Examination Report for AU2015305892, dated Sep. 1, 2020.
Examination Report for CA3040469, dated May 13, 2020.
European Search Report for EP15833172, dated Apr. 6, 2018.
European Search Report for EP17860662, dated May 6, 2020.

* cited by examiner

INTERCHANGEABLE CHROMATOGRAPHY CARTRIDGE ADAPTER SYSTEM

This application claims priority to U.S. Provisional Patent Application No. 62/788,724, filed on Jan. 4, 2019, the disclosure of which is incorporated by reference herein in its entirety.

BACKGROUND OF THE INVENTION

Field of the Invention

The present invention relates chromatography system having a cartridge adapter for quickly interchanging chromatography cartridge.

Background

Chromatography system utilize cartridges packed with absorbents to separate out components of a sample from a solvent. The cartridges have to be changed out between samples. The cartridges are typically clamped and sealed to the chromatography system and coupled to a sample gas inlet. The outlet from the cartridge is coupled to a detector for analysis. The process of changing out the cartridges is laborious and time consuming.

SUMMARY OF THE INVENTION

The invention is directed to a chromatography system having a cartridge adapter that is detachably attachable to enable chromatography cartridge to be quickly interchanged. An exemplary chromatography system comprises chromatography cartridges that are configured with threads for coupling with a corresponding interchangeable coupling component having matching threads. The interchangeable coupling component may be secured to the chromatography system by a coupling retainer. A coupling retainer may have a key way that is configured for quick interchanging of the interchangeable coupling components. The interchangeable coupling component may have a pair of parallel sides that align with a slot of the keyway to secure the interchangeable coupling components to the coupling retainer. An inlet nipple of the chromatography cartridge may extend through an opening in the coupling components and couple with an inlet conduit for sample gas. Analyte gas may flow back to the chromatography system for detection and collection. It is to be understood that the sample and analyte may be a gas, a liquid or a supercritical fluid, such as carbon dioxide; the term gas may be used throughout however, for simplicity.

An exemplary chromatography system comprises chromatography cartridges having threads of different sizes, such as different diameters or different pitch configurations. The threads of the chromatography cartridges may be configured proximal to the inlet end, such as around the outer diameter of the cartridge. The threads of the cartridge may be male threads and the threads of the interchangeable coupling component may be female threads or the threads of the cartridge may be female threads and the threads of the interchangeable coupling component may be male threads. An exemplary chromatography cartridge has an inlet on an inlet end and an inlet nipple may extend from the inlet end. The inlet nipple may extend through an opening in the interchangeable coupling component to couple with an inlet gas conduit, for receiving sample gas. An exemplary chromatography cartridge has an outlet on an outlet end that is coupled to a detector. An outlet conduit may extend from the outlet of the cartridge to the detector or to the cartridge adapter and subsequently to the detector.

An exemplary interchangeable coupling component has threads for coupling with the threads on a cartridge. The plurality of interchangeable coupling components may be provided for coupling with different threads of different size or type cartridges. An exemplary interchangeable coupling component has a cartridge end for coupling with the cartridge and a retainer portion that is retained by the coupling retainer. An exemplary retainer portion extend from the cartridge portion and has a planar side or a pair of opposing parallel planar sides that are retained in the retainer slot of the coupling retainer. The planar sides may extend a portion of the length of the retainer portion the extended end of the retainer portion may have a circular cross-section that extends through the coupling retainer to the chromatography side of the coupling retainer. An exemplary interchangeable coupling component has an opening, such as a centrally located opening that extends from the cartridge end to the retainer end to receive the inlet nipple of a cartridge.

An exemplary coupling retainer is configured for quickly coupling with an interchangeable coupling component and has a keyway having a coupling aperture for receiving the retainer end therethrough and a retainer slot that is configured around the pair of parallel sides of the retainer portion of the interchangeable coupling component. The interchangeable coupling component is inserted through the coupling aperture of the keyway and then the coupling component is then slid or move to configure the retainer slot around the pair of parallel sides of the retainer portion. This enables quick interchange of coupling components and therefore quick interchanging of cartridges. An exemplary coupling component comprises a fastener slot or preferably a pair of fastener slots that allow a fastener to retain the coupling retainer to the chromatography system while allowing it to slid or move for positioning the retainer slot around the interchangeable coupling component. The inlet nipple of the cartridge may extend through the keyway opening of the coupling retainer.

An exemplary chromatography system may comprise an interface component that is configured between the coupling retainer and the chromatography system or a fixed component. The fasteners that extend through the fastener slots of the coupling retainer may be secured into fastener apertures of the interface component, which may be threaded apertures for receiving a bolt, for example. An exemplary interface component may have apertures for fasteners to extend therethrough and into a fixed component of the chromatography system. One or more seals may be configured between components to prevent leakage of gases.

A method of changing out cartridges comprises, first removing a first cartridge and interchangeable coupling component from the chromatography system. The cartridge may be detached from the coupling component and then the coupling component can be removed by moving the coupling retainer and associated keyway to align the coupling aperture with the retainer end. A second and different cartridge, having different threads, may then be attached to the chromatography system. A new interchangeable coupling component configured for attachment to the second cartridge may first be configured with the retainer portion through the coupling retainer of a second coupling retainer. The keyway of the second coupling retainer may then be slid to align the retainer slot around the pair of parallel sides of the retainer portion of the second interchangeable coupling component. The second cartridge may then be secured to the second interchangeable coupling component by screwing the two components together. It is to be understood that the chromatography system and the cartridge adapter may be configured for any number of cartridges, which may all have different threads for attachment to a cartridge adapter.

The summary of the invention is provided as a general introduction to some of the embodiments of the invention, and is not intended to be limiting. Additional example embodiments, including variations and alternative configurations of the invention, are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figures 1, 2:
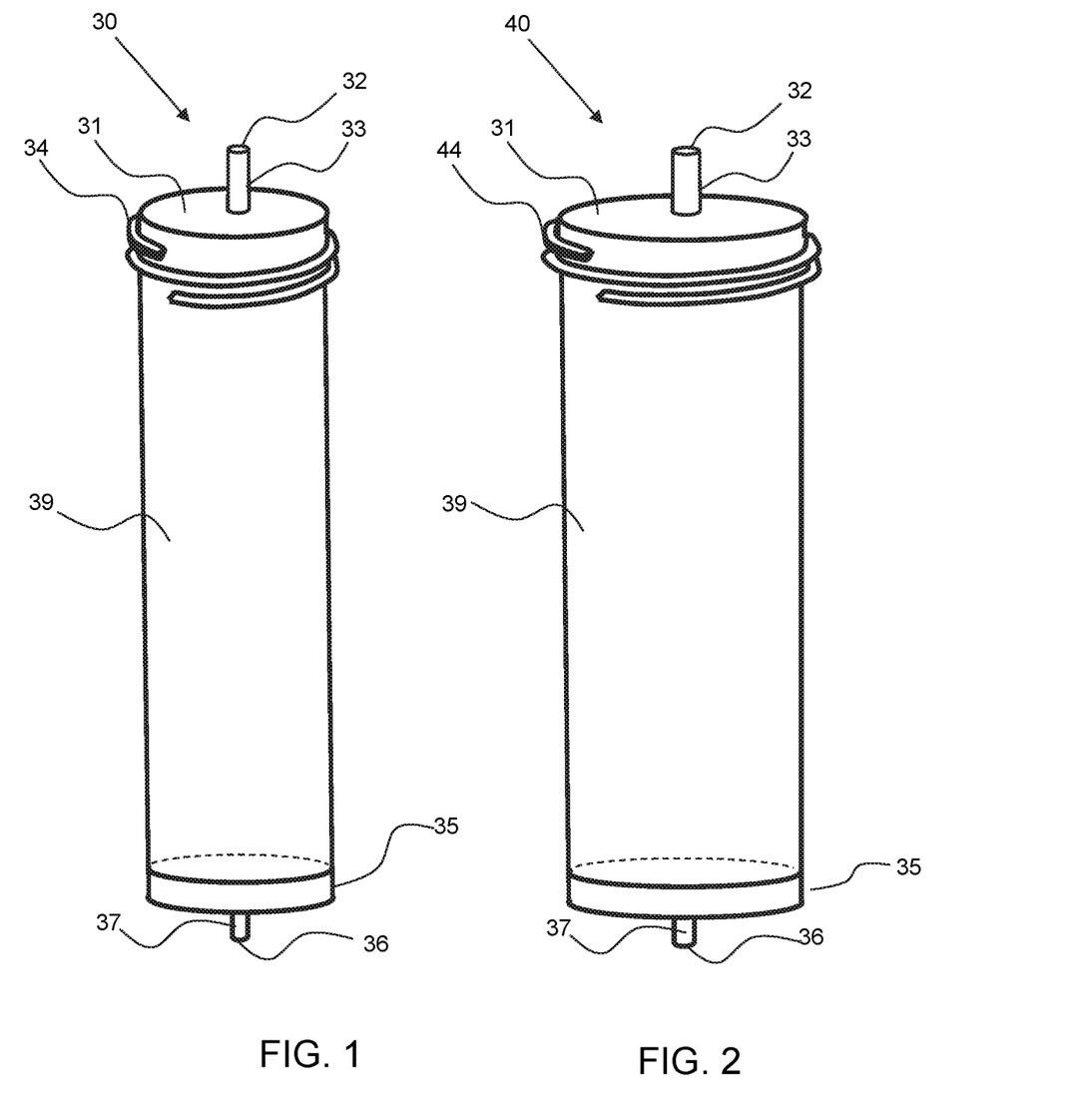
FIG. 1 shows an exemplary chromatography cartridge having threads for coupling with an interchangeable coupling component of an exemplary cartridge adapter.
FIG. 2 shows an exemplary chromatography cartridge having threads of a different dimension from that shown in FIG. 1.

As shown in FIG. 1, an exemplary chromatography cartridge 30 has threads 34 for coupling with an interchangeable coupling component of an exemplary cartridge adapter. This first cartridge is smaller than the second cartridge 40, shown in FIG. 2. The first cartridge 30 has threads 34 that are smaller in dimension than the threads 44 of the second cartridge 40. Each of the cartridges have an inlet end 31, outlet end 35, inlet 32, inlet nipple 33, outlet 36, outlet nipple 37 and an absorbent 39 retained within the cartridge. Sample gas, comprising a solvent and a specimen, flows into the inlet and an analyte gas flow out of the outlet of the cartridge and to a detector of the chromatography system.

Figure 3:
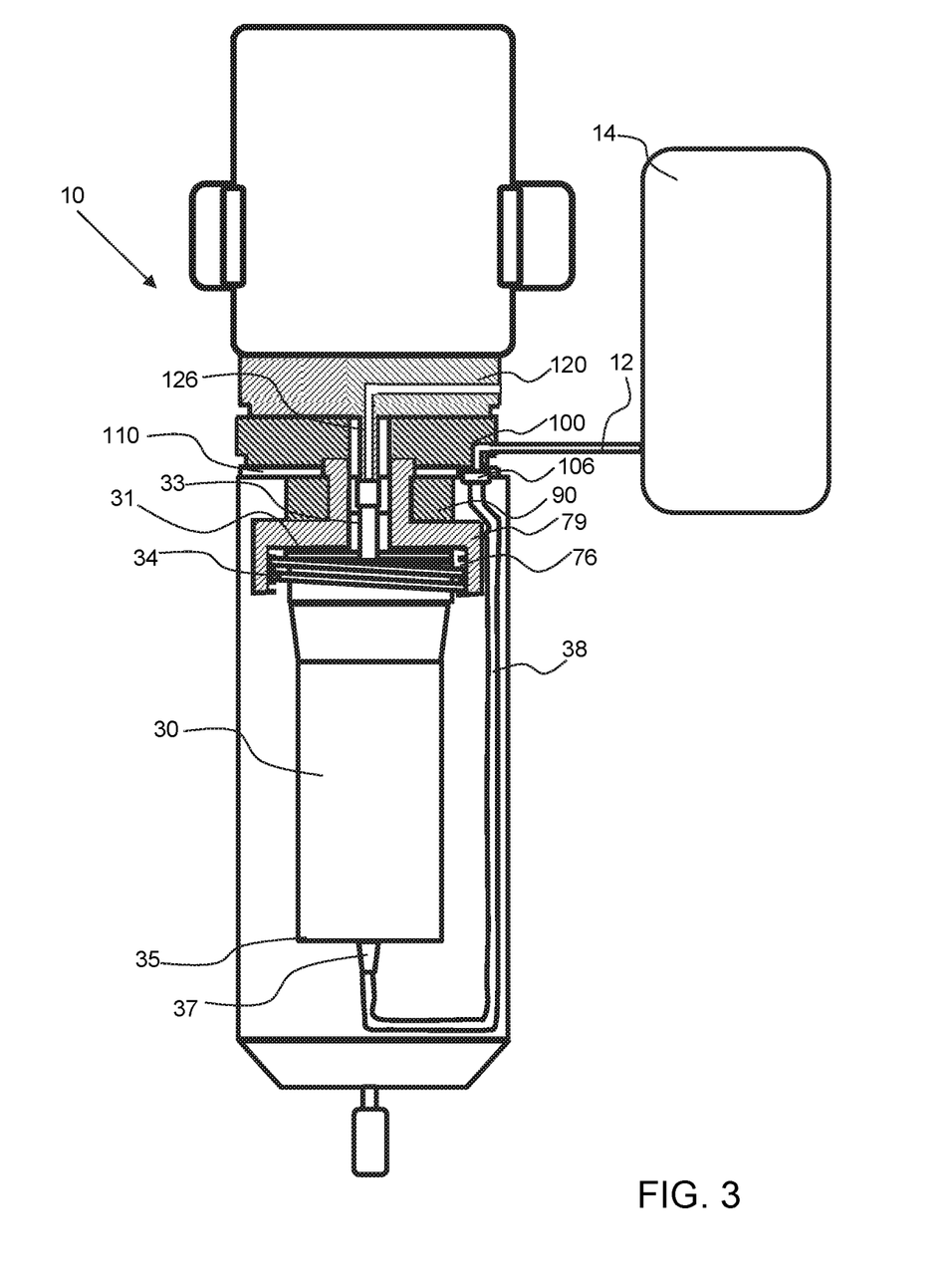
FIG. 3 shows top cross sectional view of a chromatography system comprising an exemplary cartridge adapter and a cartridge retained by said cartridge adapter.

As shown in FIG. 3, an exemplary chromatography system 10 comprises a cartridge adapter 20 for retaining a cartridge 30 having threads 34. The threads of the cartridge are coupled to, screwed into, the threads 76 of the first cartridge adapter 70. The first cartridge adapter is configured with threads for coupling the first cartridge, and a second cartridge adapter is configured with threads for coupling a second cartridge; wherein the threads of the first and second cartridges are different geometry. The inlet nipple 33 is coupled to the inlet conduit 126 of the fixed component 126 and sample gas flow into the inlet coupling 127 and into the cartridge. The sample gas is separated to produce an analyte gas that flow out of the outlet of the cartridge, such as through the outlet nipple 37 through the outlet conduit 38 to a detector 14. The outlet conduit 38 is coupled to the interface cartridge adapter by the outlet coupling which is configured on the interface component, for example, and an analyte conduit 12 extends to the detector 14. This arrangement of the inlet coupling 127 and outlet conduit coupling 106 with a non-rotating portion of the cartridge adapter enables the cartridge to be spun or threaded onto or off of the coupling component without detaching the outlet conduit. The coupling component 70 is retained by the coupling retainer 90.

Figure 4:
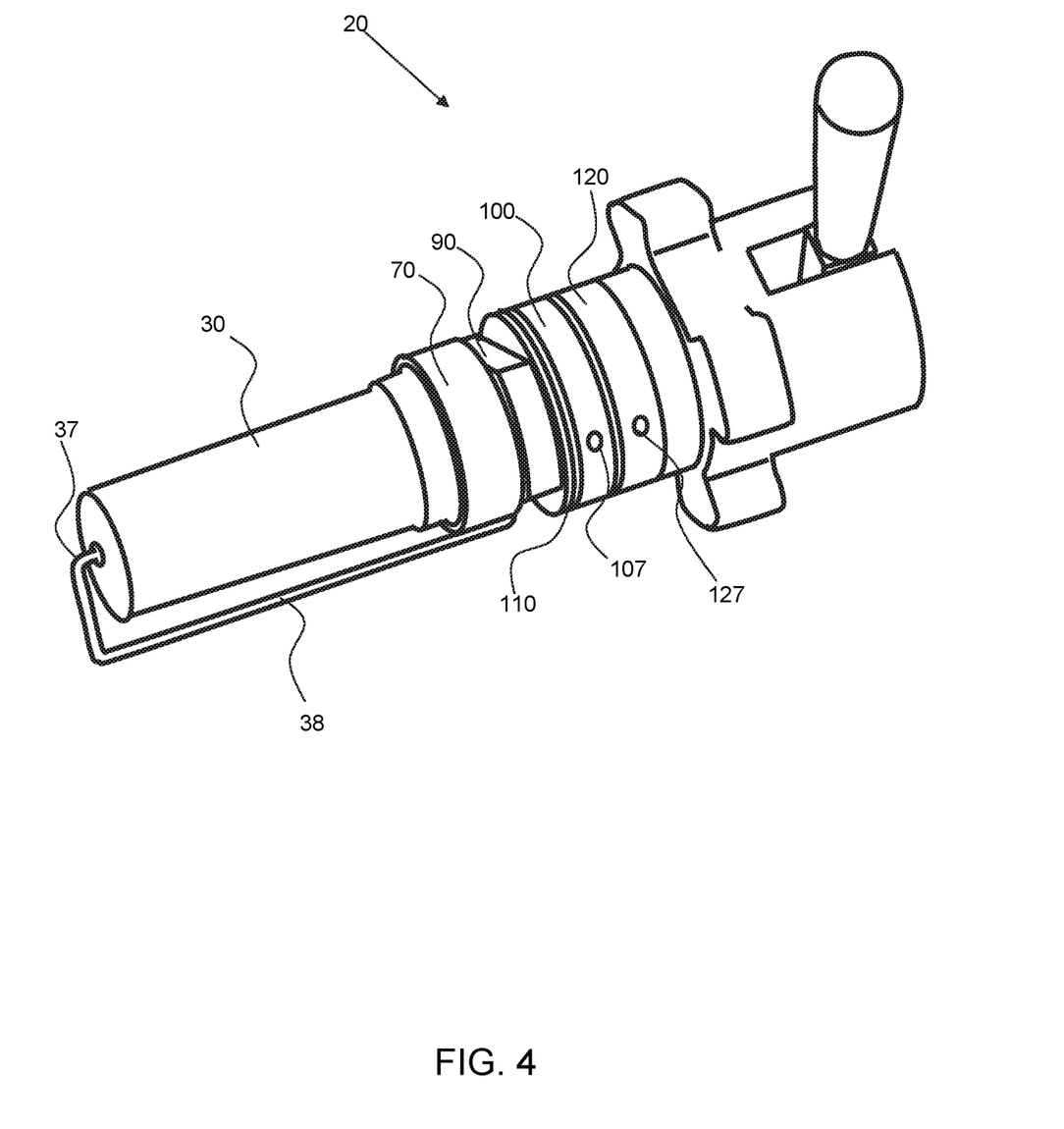
FIG. 4 shows perspective view of a chromatography system comprising an exemplary cartridge adapter and a cartridge retained by said cartridge adapter.

As shown in FIG. 4, a chromatography system comprises an exemplary cartridge adapter 20 and a cartridge 30 retained by said cartridge adapter. The inlet 127 for the sample gas is shown on the fixed component 120, and the outlet coupling 107 for the analyte gas is shown on the interface component 100. The cartridge 30 is screwed into the coupling component 70, and the coupling component is retained by the coupling retainer 90.

Figure 5:
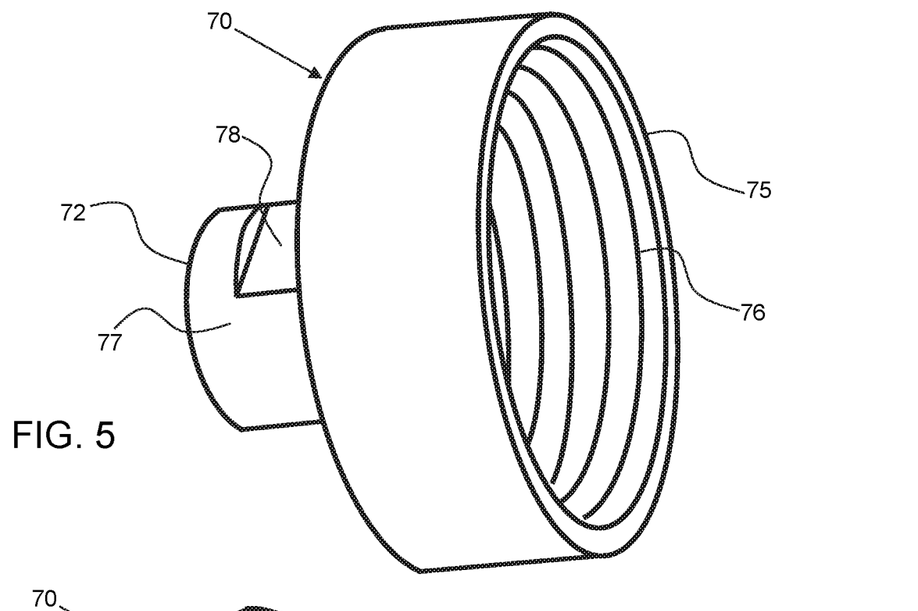
FIGS. 5 and 6 show an exemplary coupling component comprising threads for coupling with the threads of a cartridge and a retainer end for insertion into the keyway of the coupling retainer.
Figure 6:
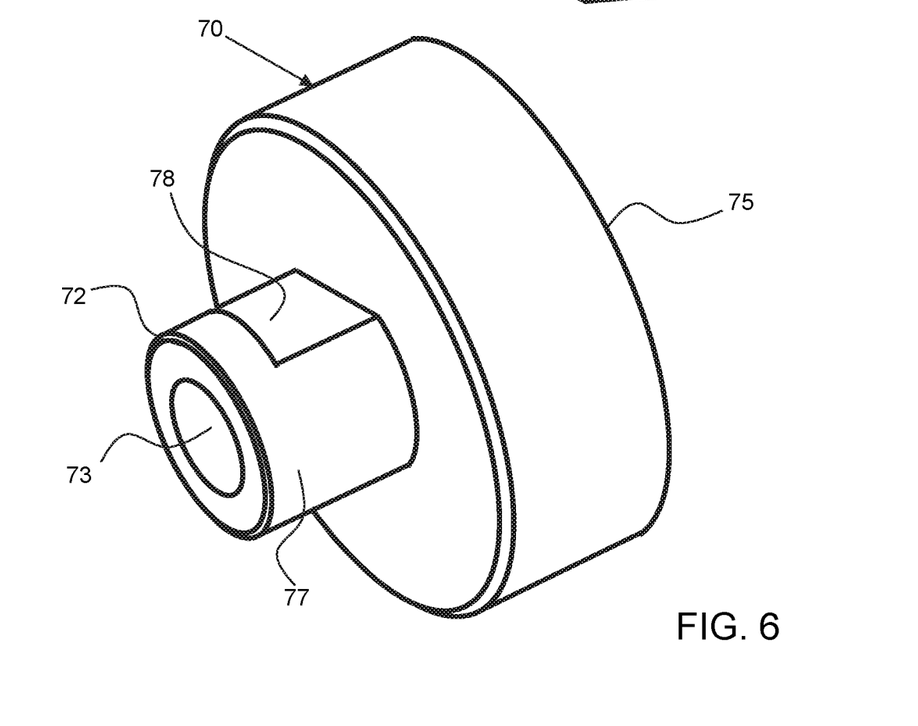

As shown in FIGS. 5 and 6, an exemplary coupling component 70 comprises threads 76 for coupling with the threads of a cartridge, and a retainer end 72 for insertion into the keyway of the coupling retainer. The coupling retainer has a large aperture in the keyway to receive the retainer end 72, and a smaller extension portion of the keyway, a retainer slot for example, for sliding over the planar side of the retainer portion 77. An exemplary coupling component has a pair of parallel planar sides to firmly secure the coupling component to the coupling retainer. The coupling component has an opening for the inlet of sample gas wherein the inlet nipple of the cartridge and/or the inlet conduit of the fixed component is configured therein or therethrough.

Figure 7:
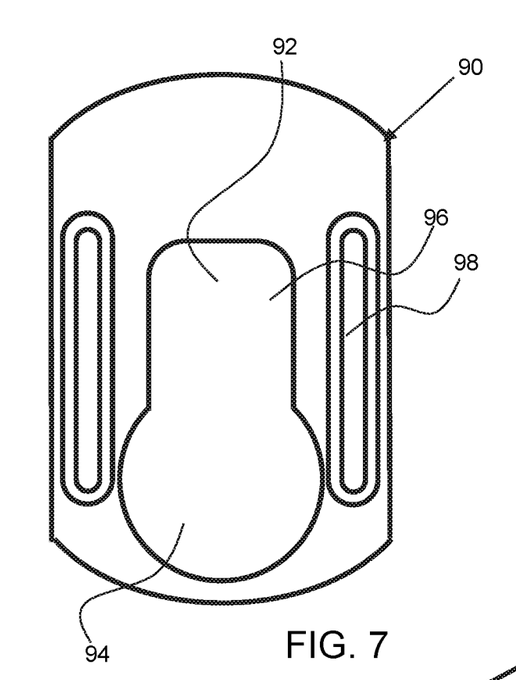
FIG. 7 shows a front view of an exemplary coupling retainer having a keyway and coupling aperture to receive the retainer end of a coupling component.
Figure 8:
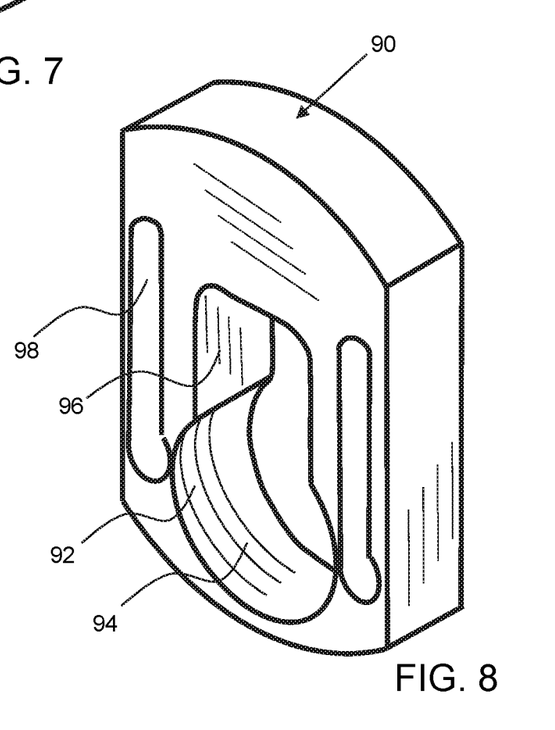
FIG. 8 shows a perspective view of an exemplary coupling retainer having a keyway and coupling aperture to receive the retainer end of a coupling component.

As shown in FIGS. 7 and 8, an exemplary coupling retainer 90 has a keyway 92 and coupling aperture 94 to receive the retainer end of a coupling component. The coupling aperture 94 of the keyway 92 is large in dimension, and the retainer slot 96 is smaller in dimension and has two parallel sides for engagement with the two parallel sides of the coupling component. The coupling retainer has fastener slots 98 for receiving a fastener, such as a bolt, that secures the coupling retainer to the interface component.

Figure 9:
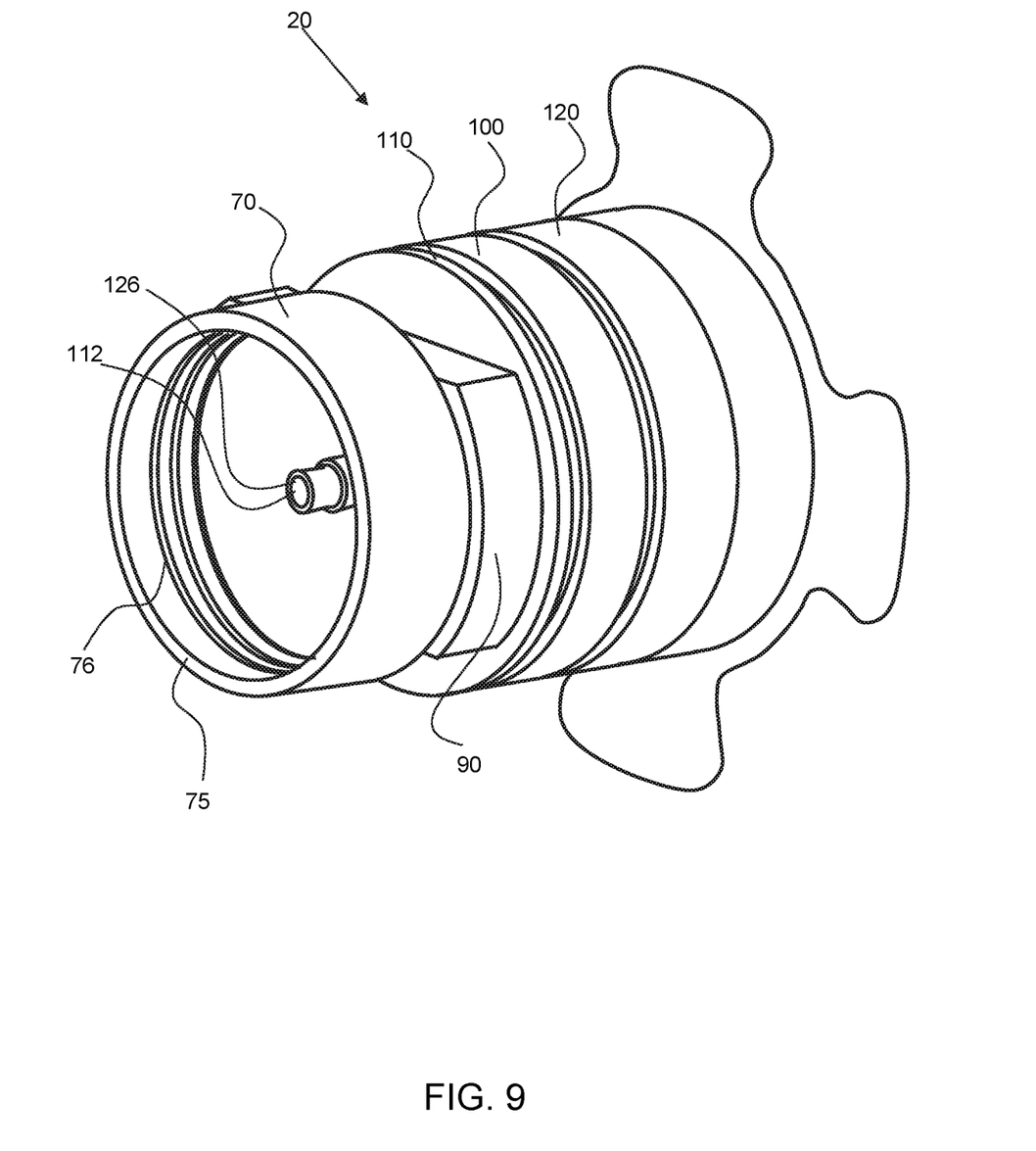
FIG. 9 shows a perspective view of an exemplary cartridge adapter comprising a coupling component that is retained by a coupling retainer.

As shown in FIG. 9, an exemplary cartridge adapter 20 comprises a coupling component 70 that is retained by a coupling retainer 90. The inlet conduit 126 extends through the coupling component for coupling to the inlet nipple of the cartridge.

Figure 10:
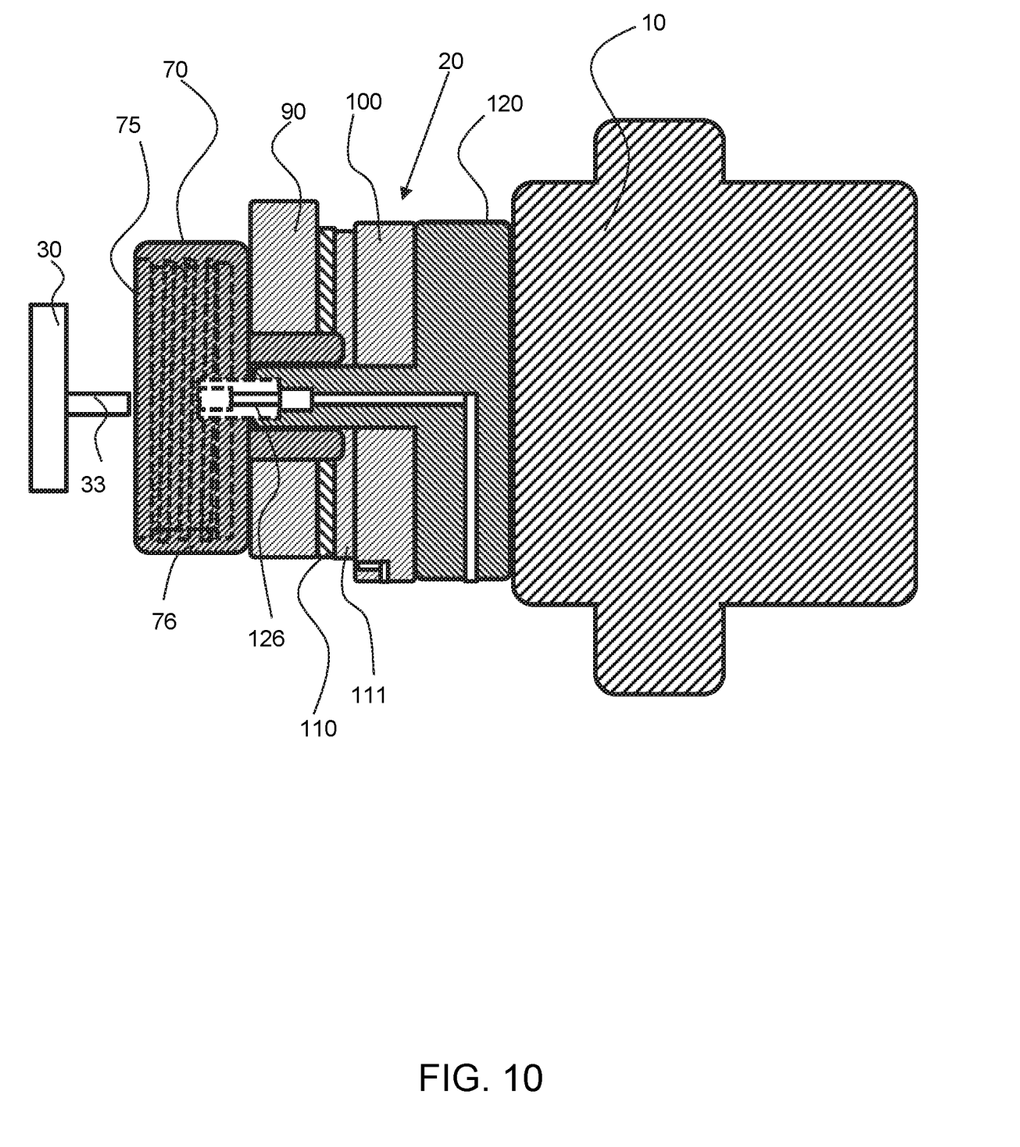
FIG. 10 shows a cross sectional view of an exemplary cartridge adapter comprising a coupling component that is retained by a coupling retainer and an inlet conduit for coupling to an inlet nipple of a cartridge.

As shown in FIG. 10, an exemplary cartridge adapter 20 comprises a coupling component 70 that is retained by a coupling retainer 90 and an inlet conduit 126 for coupling to an inlet nipple 33 of a cartridge 30.

Figure 11:
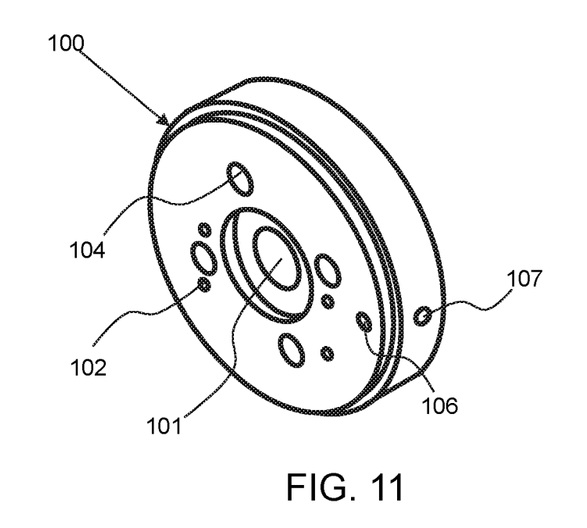
FIG. 11 shows a perspective view of an exemplary interface component having apertures for coupling the interface component to the fixed component and apertures for retaining the coupling component to the interface component by fasteners, such as bolts.
Figure 12:
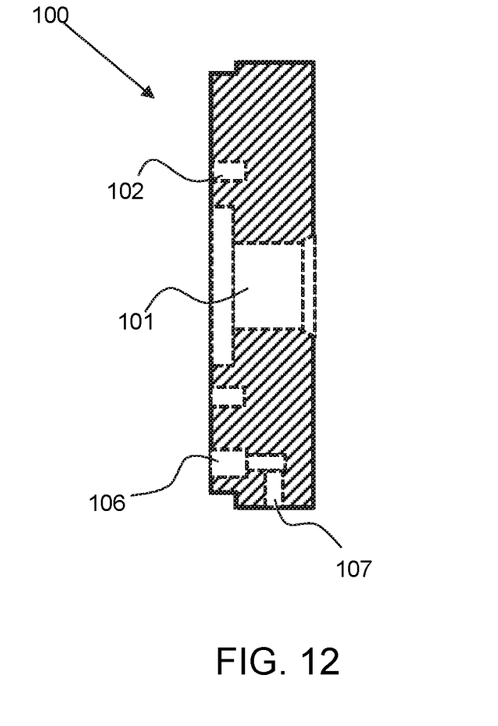
FIG. 12 shows a cross sectional view of an exemplary interface component having an outlet conduit and outlet for the analyte gas.

As shown in FIGS. 11 and 12, an exemplary interface component 100 has fixed component apertures 104 for coupling the interface component to the fixed component, and coupling retainer apertures 102 for retaining the coupling component to the interface component by fasteners, such as bolts. The interface component 100 has an outlet conduit coupling 106 and an outlet coupling 107 for the analyte gas.

Figure 13:
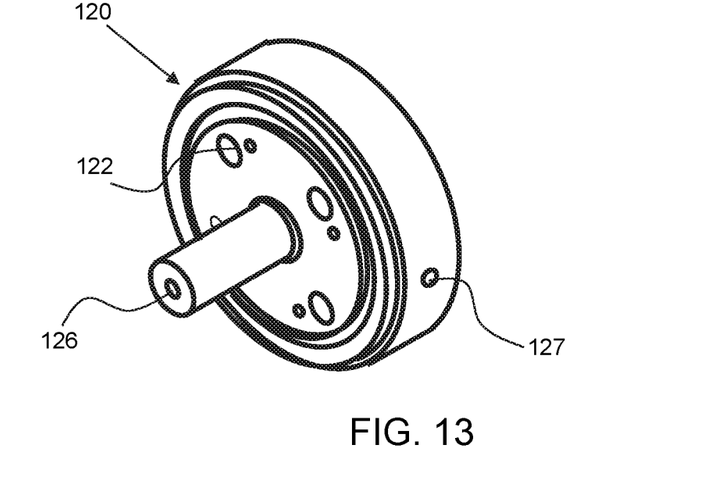
FIG. 13 shows a perspective view of an exemplary fixed component having apertures for coupling the fixed component to the chromatography device by fasteners, such as bolts.
Figure 14:
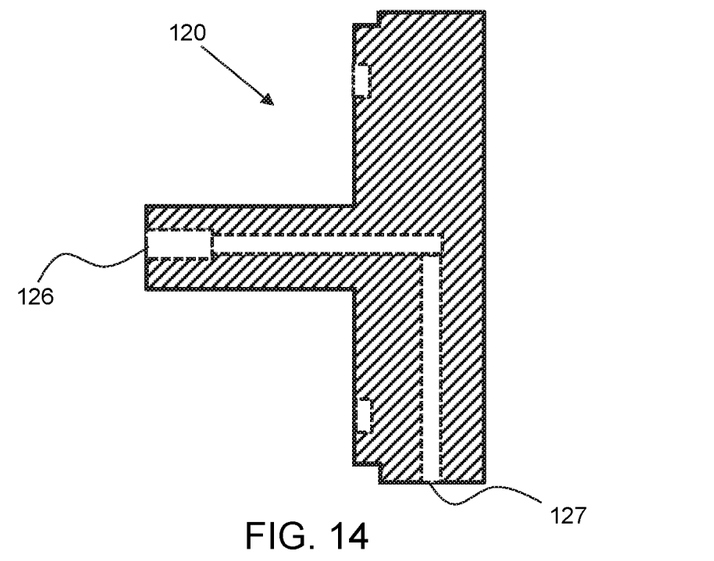
FIG. 14 shows a cross sectional view of an exemplary fixed component having an inlet conduit and inlet for the sample gas.

As shown in FIGS. 12 and 13, an exemplary fixed component 120 has interface retainer apertures 122 for coupling the interface component to the fixed component, and device apertures 124 for coupling the fixed component to the gas chromatography system by fasteners, such as bolts.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A chromatography system comprising:
   a) a first chromatography cartridge comprising:
      i) an inlet end having an inlet;
      ii) a threaded cartridge portion comprising threads with a first external diameter;
      iii) an outlet;
   b) a second chromatography cartridge comprising:
      i) an inlet end having an inlet;
      ii) a threaded cartridge portion comprising threads with a second external diameter larger than said first external diameter of the threads of the first chromatography cartridge;
      iii) an outlet;
   c) a cartridge adapter comprising;
      i) a first interchangeable coupling component that is detachably attachable to the chromatography system and comprising:
         a cartridge portion configured on a cartridge end having threads that couple with the threads of the threaded cartridge portion of the first chromatography cartridge;
      ii) a second interchangeable coupling component that is detachably attachable to the chromatography system and comprising:
         a cartridge portion configured on a cartridge end having threads that couple with the threads of the threaded cartridge portion of the second chromatography cartridge;
      wherein the first chromatography cartridge is secured to the cartridge adapter by coupling the threads of the first chromatography cartridge with the threads of the first interchangeable coupling component; and
      wherein the second chromatography cartridge is secured to the cartridge adapter by coupling the threads of the second chromatography cartridge with the threads of the second interchangeable coupling component; and wherein the first and second chromatography cartridges are interchangeably detachably coupled to the chromatography system.

2. The chromatography system of claim 1, wherein the cartridge adapter further comprises a coupling retainer comprising:
   a) a keyway aperture comprising:
   b) a coupling aperture;
   c) a retainer slot comprising two parallel slot sides;
      wherein both the first interchangeable coupling component and the second interchangeable coupling component have a retainer portion extending from the cartridge portion to a retainer end and having a pair of opposing planar sides configured between the cartridge portion and said retainer end; and
      wherein the retainer portion of both the first interchangeable coupling component and the second interchangeable coupling component are configured for insertion through the coupling aperture and configured to be retained in said keyway aperture with the retainer slot configured around the pair of opposing planar sides.

3. The chromatography system of claim 2, wherein the coupling retainer further comprises a fastener slot configured to receive a fastener therethrough to retain the coupling retainer to the chromatography system and wherein the coupling retainer is slidably engaged with the chromatography system along said fastener slot.

4. The chromatography system of claim 3, wherein the coupling retainer comprises two parallel fastener slots.

5. The chromatography system of claim 1, wherein both the first interchangeable coupling component and the second interchangeable coupling component have an opening extending from a retainer end to the cartridge end; and wherein both the first chromatography cartridge and second chromatography cartridge have an inlet nipple configured to extend through said opening of the interchangeable coupling components when secured to the coupling component.

6. The chromatography system of claim 5, wherein the chromatography system comprises an inlet conduit, wherein the inlet nipple of the first chromatography cartridge is coupled to the inlet conduit when said first chromatography cartridge is secured to the first interchangeable coupling component that is secured to the chromatography system; and wherein the inlet nipple of the second chromatography cartridge is coupled to the inlet conduit when said second chromatography cartridge is secured to the second interchangeable coupling component that is secured to the chromatography system.

7. The chromatography system of claim 1, further comprising an outlet conduit coupling for analyte gas on the cartridge adapter.

8. The chromatography system of claim 1, further comprising an inlet coupling for sample gas on the cartridge adapter.

9. A method of changing from a first chromatography cartridge coupled to a chromatography system to a second chromatography cartridge comprising:
a) providing the chromatography system of claim 1 wherein the first chromatography cartridge is coupled to the first interchangeable coupling component and wherein the first interchangeable coupling component is secured to the chromatography system;
b) detaching the first interchangeable coupling component from the chromatography system;
c) attaching the second interchangeable coupling component to the chromatography system; and
d) attaching the second chromatography cartridge to the second interchangeable coupling component.

10. The method of changing from a first chromatography cartridge coupled to a chromatography system to a second chromatography cartridge of claim 9,
wherein the cartridge adapter further comprises a coupling retainer comprising:
a) a keyway aperture comprising:
b) a coupling aperture;
c) a retainer slot comprising two parallel slot sides;
wherein both the first interchangeable coupling component and the second interchangeable coupling component have a retainer portion extending from the cartridge portion to a retainer end and having a pair of opposing planar sides configured between the cartridge portion and said retainer end; and
wherein the retainer portion of both the first interchangeable coupling component and the second interchangeable coupling component are configured for insertion through the coupling aperture and configured to be retained in said keyway aperture with the retainer slot configured around the pair of opposing planar sides;
wherein detaching the first interchangeable coupling component from the chromatography system comprises moving the coupling retainer to align the retainer portion with the coupling aperture to detach the first interchangeable coupling component from the coupling retainer; and wherein attaching the second interchangeable coupling component to the chromatography system comprises inserting the retainer portion of the first interchangeable coupling component through the coupling aperture of the coupling retainer and moving the coupling retainer to configure the retainer slot around the pair of opposing planar sides of the second interchangeable coupling component.

11. The method of changing from a first chromatography cartridge coupled to a chromatography system to a second chromatography cartridge of claim 10,
wherein the coupling retainer further comprises a fastener slot configured to receive a fastener therethrough to retain the coupling retainer to the chromatography system, and wherein the coupling retainer is slidably engaged with the chromatography system along said fastener slot.

12. The method of changing from a first chromatography cartridge coupled to a chromatography system to a second chromatography cartridge of claim 11, wherein the coupling retainer comprises two parallel fastener slots.

13. The method of changing from a first chromatography cartridge coupled to a chromatography system to a second chromatography cartridge of claim 9, wherein both the first interchangeable coupling component and the second interchangeable coupling component have an opening extending from a retainer end to the cartridge end; and wherein both the first chromatography cartridge and second chromatography cartridge have an inlet nipple configured to extend through said opening of the interchangeable coupling components when secured to the coupling component.

14. The method of changing from a first chromatography cartridge coupled to a chromatography system to a second chromatography cartridge of claim 13, wherein the chromatography system comprises an inlet conduit and wherein the inlet nipple of the first chromatography cartridge is coupled to the inlet conduit when said first chromatography cartridge is attached to the first interchangeable coupling component that is secured to the chromatography system; and wherein the inlet nipple of the second chromatography cartridge is coupled to the inlet conduit when said second chromatography cartridge is attached to the second interchangeable coupling component that is secured to the chromatography system.

15. The method of changing from a first chromatography cartridge coupled to a chromatography system to a second chromatography cartridge of claim 9, wherein the cartridge adapter further comprises an outlet conduit coupling for coupling to the outlet conduit for analyte gas, and wherein detaching the first interchangeable coupling component from the chromatography system does not require detaching an outlet conduit from the outlet conduit coupling.

16. The method of changing from a first chromatography cartridge coupled to a chromatography system to a second chromatography cartridge of claim 15,
wherein the cartridge adapter further comprises a coupling retainer comprising:
a) a keyway aperture comprising:
b) a coupling aperture;
c) a retainer slot comprising two parallel slot sides;
wherein both the first interchangeable coupling component and the second interchangeable coupling component have a retainer portion extending from the cartridge portion to a retainer end and having a pair of opposing planar sides configured between the cartridge portion and said retainer end; and wherein the retainer portion of both the first interchangeable coupling component and the second interchangeable coupling component are configured for insertion through the coupling aperture and configured to be retained in said keyway aperture with the retainer slot configured around the pair of opposing planar sides;

wherein detaching the first interchangeable coupling component from the chromatography system comprises moving the coupling retainer to align the retainer portion with the coupling aperture to detach the first interchangeable coupling component from the coupling retainer; and wherein attaching the second interchangeable coupling component to the chromatography system comprises inserting the retainer portion of the first interchangeable coupling component through the coupling aperture of the coupling retainer and moving the coupling retainer to configure the retainer slot around the pair of opposing planar sides of the second interchangeable coupling component.

17. The method of changing from a first chromatography cartridge coupled to a chromatography system to a second chromatography cartridge of claim 16, wherein the coupling retainer further comprises a fastener slot configured to receive a fastener therethrough to retain the coupling retainer to the chromatography system, and wherein the coupling retainer is slidably engaged with the chromatography system along said fastener slot.

18. The method of changing from a first chromatography cartridge coupled to a chromatography system to a second chromatography cartridge of claim 17, wherein the coupling retainer comprises two parallel fastener slots.

19. The method of changing from a first chromatography cartridge coupled to a chromatography system to a second chromatography cartridge of claim 9, wherein both the first interchangeable coupling component and the second interchangeable coupling component have an opening extending from the retainer end to the cartridge end; and wherein both the first chromatography cartridge and second chromatography cartridge have an inlet nipple configured to extend through said opening of the interchangeable coupling components when secured to the coupling component, wherein the cartridge adapter further comprises an outlet conduit coupling for coupling to the outlet conduit for analyte gas, and wherein detaching the first interchangeable coupling component from the chromatography system does not require detaching an outlet conduit from the outlet conduit coupling.

20. The method of changing from a first chromatography cartridge coupled to a chromatography system to a second chromatography cartridge of claim 19, wherein the chromatography system comprises an inlet conduit and wherein the inlet nipple of the first chromatography cartridge is coupled to the inlet conduit when said first chromatography cartridge is attached to the first interchangeable coupling component that is secured to the chromatography system; and wherein the inlet nipple of the second chromatography cartridge is coupled to the inlet conduit when said second chromatography cartridge is attached to the second interchangeable coupling component that is secured to the chromatography system.

21. The method of changing from a first chromatography cartridge coupled to a chromatography system to a second chromatography cartridge of claim 9, wherein the cartridge adapter further comprises an inlet coupling for sample gas; and wherein detaching the first interchangeable coupling component from the chromatography system does not require detaching a sample gas coupling from the inlet coupling for the sample gas.

22. The method of changing from a first chromatography cartridge coupled to a chromatography system to a second chromatography cartridge of claim 21, wherein the cartridge adapter further comprises a coupling retainer comprising:
a) a keyway aperture comprising:
b) a coupling aperture;
c) a retainer slot comprising two parallel slot sides;
wherein both the first interchangeable coupling component and the second interchangeable coupling component have a retainer portion extending from the cartridge portion to a retainer end and having a pair of opposing planar sides configured between the cartridge portion and said retainer end; and wherein the retainer portion of both the first interchangeable coupling component and the second interchangeable coupling component are configured for insertion through the coupling aperture and configured to be retained in said keyway aperture with the retainer slot configured around the pair of opposing planar sides;

wherein detaching the first interchangeable coupling component from the chromatography system comprises moving the coupling retainer to align the retainer portion with the coupling aperture to detach the first interchangeable coupling component from the coupling retainer; and wherein attaching the second interchangeable coupling component to the chromatography system comprises inserting the retainer portion of the first interchangeable coupling component through the coupling aperture of the coupling retainer and moving the coupling retainer to configure the retainer slot around the pair of opposing planar sides of the second interchangeable coupling component.

23. The method of changing from a first chromatography cartridge coupled to a chromatography system to a second chromatography cartridge of claim 22, wherein the coupling retainer further comprises a fastener slot configured to receive a fastener therethrough to retain the coupling retainer to the chromatography system, and wherein the coupling retainer is slidably engaged with the chromatography system along said fastener slot.

24. The method of changing from a first chromatography cartridge coupled to a chromatography system to a second chromatography cartridge of claim 23, wherein the coupling retainer comprises two parallel fastener slots.

25. The method of changing from a first chromatography cartridge coupled to a chromatography system to a second chromatography cartridge of claim 9, wherein both the first interchangeable coupling component and the second interchangeable coupling component have an opening extending from a retainer end to the cartridge end;

wherein both the first chromatography cartridge and second chromatography cartridge have an inlet nipple configured to extend through said opening of the interchangeable coupling components when secured to the coupling component; and wherein the cartridge adapter further comprises an inlet coupling for sample gas; and wherein detaching the first interchangeable coupling component from the chromatography system does not require detaching a sample gas coupling from the inlet coupling for the sample gas.

26. The method of changing from a first chromatography cartridge coupled to a chromatography system to a second chromatography cartridge of claim 25, wherein the chromatography system comprises an inlet conduit and wherein the inlet nipple of the first chromatography cartridge is coupled to the inlet conduit when said first chromatography cartridge is attached to the first interchangeable coupling component that is secured to the chromatography system; and
   wherein the inlet nipple of the second chromatography cartridge is coupled to the inlet conduit when said second chromatography cartridge is attached to the second interchangeable coupling component that is secured to the chromatography system.

27. The method of changing from a first chromatography cartridge coupled to a chromatography system to a second chromatography cartridge of claim 9, wherein the cartridge adapter further comprises an outlet conduit coupling for coupling to an outlet conduit for analyte gas, and wherein detaching the first interchangeable coupling component from the chromatography system does not require detaching an outlet conduit from the outlet conduit coupling; and
   wherein the cartridge adapter further comprises an inlet coupling for sample gas; and wherein detaching the first interchangeable coupling component from the chromatography system does not require detaching a sample gas coupling from the inlet coupling for the sample gas.

28. A chromatography system comprising:
   a) a first chromatography cartridge comprising:
      i) an inlet end having an inlet nipple extending from said inlet end;
      ii) a threaded cartridge portion comprising threads with a first external diameter;
      iii) an outlet;
   b) a second chromatography cartridge comprising:
      i) an inlet end having an inlet nipple extending from said inlet end;
      ii) a threaded cartridge portion comprising threads with a second external diameter larger than said first external diameter of the threads of the first chromatography cartridge;
   c) a cartridge adapter;
      i) a first interchangeable coupling component that is detachably attachable to the chromatography system and comprising:
         a cartridge portion configured on a cartridge end having threads that couple to the threads of the threaded cartridge portion of the first chromatography cartridge;
         a retainer portion extending from the cartridge portion to a retainer end and having a pair of opposing planar sides configured between the cartridge portion and said retainer end;
         an opening extending from the retainer end to the cartridge end;
      ii) a second interchangeable coupling component that is detachably attachable to the chromatography system and comprising:
         a cartridge portion configured on a cartridge end having threads that couple to the threads of the threaded cartridge portion of the second chromatography cartridge;
         a retainer portion extending from the cartridge portion to a retainer end and having a pair of opposing planar sides configured between the cartridge portion and said retainer end;
         an opening extending from the retainer end to the cartridge end;
      wherein the first chromatography cartridge is secured to the cartridge adapter by coupling the threads of the first chromatography cartridge to the threads of the first interchangeable coupling component; and
      wherein the second chromatography cartridge is secured to the cartridge adapter by coupling the threads of the second chromatography cartridge to the threads of the second interchangeable coupling component; and wherein the first and second chromatography cartridges are interchangeable;
      iii) a coupling retainer comprising:
         a keyway aperture comprising:
         a coupling aperture;
         a retainer slot comprising two parallel slot sides;
         a fastener slot configured to receive a fastener therethrough to retain the coupling retainer to the chromatography system and wherein the coupling retainer is slidably engaged with the chromatography system along said fastener slot;
      wherein the retainer portion of both the first interchangeable coupling component and the second interchangeable coupling component are configured for insertion through the coupling aperture and configured to be retained in said keyway aperture with the retainer slot configured around the pair of opposing planar sides; and
      wherein the inlet nipple is configured to extend through said opening of the interchangeable coupling components.

29. The chromatography system of claim 28, wherein the chromatography system comprises an inlet conduit and wherein the inlet nipple of the first chromatography cartridge is coupled to the inlet conduit when said first chromatography cartridge is secured to the first interchangeable coupling component that is secured to the chromatography system; and
   wherein the inlet nipple of the second chromatography cartridge is coupled to the inlet conduit when said second chromatography cartridge is secured to the second interchangeable coupling component that is secured to the chromatography system.

30. A chromatography system of claim 29, wherein the cartridge adapter further comprises:
   i) a fixed component secured to the chromatography system by a fastener and comprising:
      a fastener aperture;
      cartridge outlet for a return conduit;
   ii) an interface component comprising:
      a coupling retainer aperture for receiving a fastener that extends through the fastener slot of the coupling retainer;
      a fixed component aperture for receiving a fastener that extends through the interface component and into the fixed component;
      a cartridge inlet for receiving the return conduit; and
   iii) a seal between the interface component and the coupling retainer.

31. The chromatography system of claim 28, further comprising an outlet conduit coupling for analyte gas on the cartridge adapter.

32. The chromatography system of claim 28, further comprising an inlet coupling for sample gas on the cartridge adapter.

\* \* \* \* \*

UNITED STATES PATENT AND TRADEMARK OFFICE
CERTIFICATE OF CORRECTION

| | |
|---|---|
| PATENT NO. | : 11,946,915 B2 |
| APPLICATION NO. | : 17/416964 |
| DATED | : April 2, 2024 |
| INVENTOR(S) | : Curtis Ebersold et al. |

It is certified that error appears in the above-identified patent and that said Letters Patent is hereby corrected as shown below:

On the Title Page

Item (72) Inventors:
Please add the inventors below to the list:
-- Kenneth Joseph James, Newark, DE (US)
Kenneth Richard Krewson, Allentown, NJ (US) --

Signed and Sealed this
First Day of October, 2024

Katherine Kelly Vidal
*Director of the United States Patent and Trademark Office*